United States Patent [19]
Sorensen

[11] 3,879,266
[45] Apr. 22, 1975

[54] DISTILLATION APPARATUS

[76] Inventor: George C. Sorensen, 589 S.E. 4th, Ontario, Oreg. 97914

[22] Filed: Oct. 29, 1973

[21] Appl. No.: 410,296

Related U.S. Application Data

[63] Continuation-in-part of Ser. No. 141,861, Nov. 6, 1972, Pat. No. 3,779,005, Continuation-in-part of Ser. No. 304,125, Nov. 6, 1972, abandoned.

[52] U.S. Cl. .................. 202/236; 159/16 R; 203/11; 203/26; 123/119 R; 203/90; 203/91; 47/1.2
[51] Int. Cl. ........................... B01d 3/08; B01d 3/28
[58] Field of Search ........ 202/236, 233; 203/10, 11, 203/24, 26, 88, 90, 91, 100; 159/16 R, 16 S, 24 R

[56] References Cited
UNITED STATES PATENTS

| | | | |
|---|---|---|---|
| 2,589,406 | 3/1952 | Latham | 202/24 |
| 2,637,684 | 5/1953 | Buffum | 159/24 R |
| 3,393,131 | 7/1968 | McIntyre | 159/16 R |

FOREIGN PATENTS OR APPLICATIONS

| 336,611 | 5/1921 | Germany | 159/16 S |
|---|---|---|---|

Primary Examiner—Norman Yudkoff
Assistant Examiner—D. Sanders

[57] ABSTRACT

A distillation retort is provided including a raw fluid submerged device for spraying raw fluid upwardly against the under surface of a splash shield to be greatly atomized providing an immense total raw fluid surface area for evaporation. A combination pump and compressor draws vapor from the splash shield protected atomized raw fluid urged and heated for evaporation by the mingling commonly wasted heat from a cooperating combustion engine. The resultant mixture of vapor is compressed and condensed in a heat exchanger submerged in the included raw fluid sump. The resultant condensate is accumulated for biological production while a concentrated raw fluid is drained for further process or waste and the dehydrated gas is expanded through a fueling system turbo blower then recycled for further condensate entrainment.

4 Claims, 3 Drawing Figures

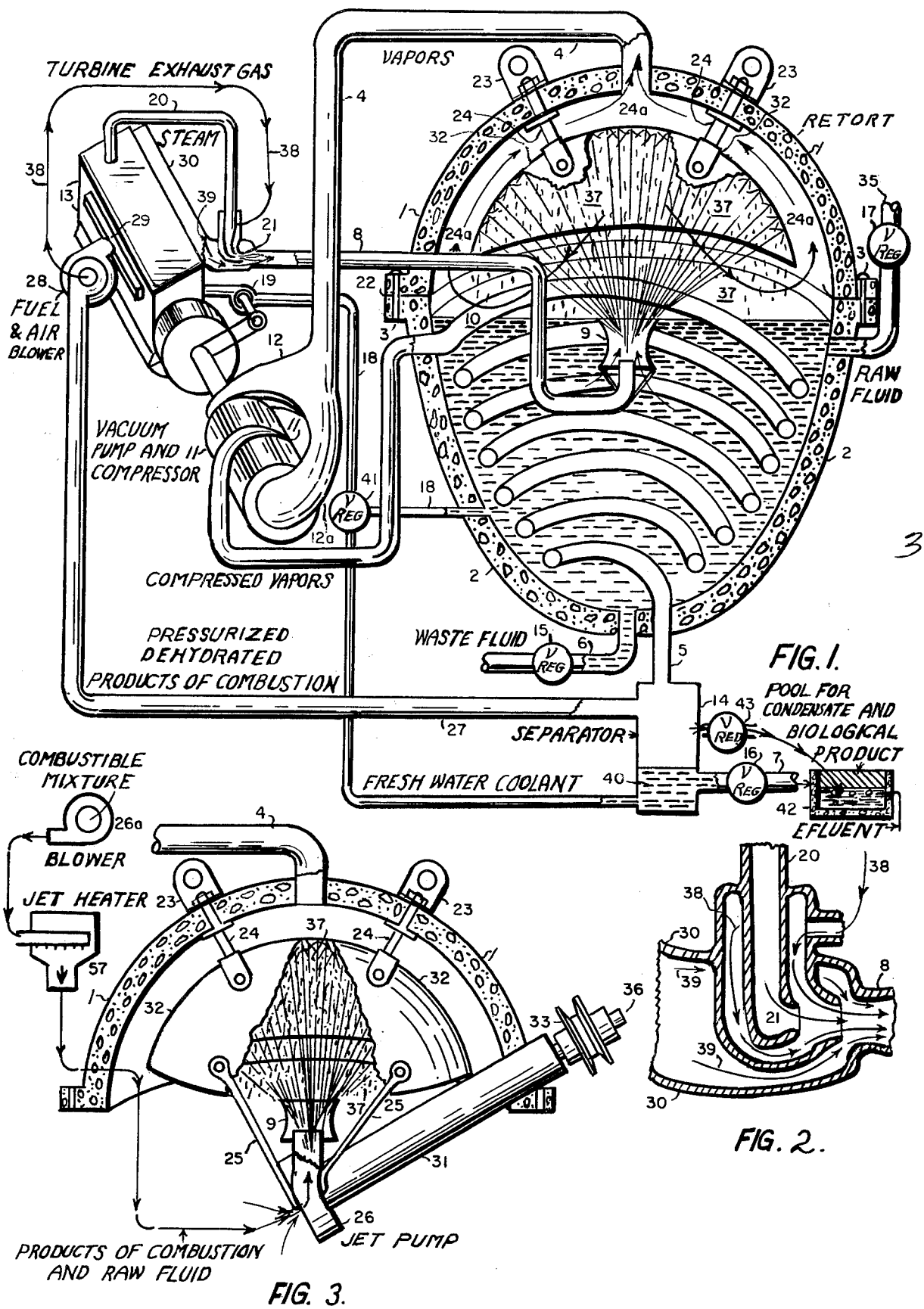

3,879,266

DISTILLATION APPARATUS

This application is a continuation-in-part of my copending application filed Nov. 6, 1972 Ser. No. 304125 now abandoned and a related application filed May 10, 1971 Ser. No. 141868 now U.S. Pat. No. 3,779,005.

BACKGROUND OF THE INVENTION

The invention relates to evaporating and condensation purification of a raw fluid. Conventionally this is accomplished by boiling the raw fluid in a vacuum chamber depending on the surface area of the fluid to provide the evaporation area. Often times several units connected in series are required to furnish sufficient evaporation area. Some systems spin the fluid in a cone causing the fluid to spread in a film over the inside of the cone to increase the evaporation area. Obviously a retort of enormous size must be provided to acquire sufficient relative evaporation area.

OBJECTS OF THE INVENTION

A primary object of the invention is to immensly increase the evaporation area relative to the size of the retort by spray atomizing its raw fluid against the underside of a splash shield further increasing the evaporation area and prolonging evaporation exposure by the up and down movement of the particulates, while the splash shield spaced away from the retort shell provides a vapor collecting area protected from the raw fluid.

It is a further object of the invention to use the conventionally wasted heat of a cooperating compressor combustion engine to energize the spray system and to heat the spray particles by mingling association with the products of combustion.

It is a further object of the invention to entrain the products of combustion with the raw fluid vapor for compression heat exchange through a submerged condenser or heat exchanger to the raw fluid, and to capture the combustion compounded condensate for plant food.

It is another object of the invention to provide a distillation plant for purifying many kinds of fluid.

SUMMARY OF THE INVENTION

FIG. 1 is a sectional view of a distillation retort showing the internal arrangement of the improvement structure also the outer plumbing, engine and compressor, and pond for biological production.

FIG. 2 is an illustration of an injection device for drawing dehydrated gas from turbo blower for further energizing engine exhaust raw fluid spray, and for further combining $CO_2$, $N_3$ and $H_2O$.

FIG. 3 shows the upper portion of a distillation retort and the type of spraying device required when the operating power is other than a combustion engine.

Such a system as was described for use with a combustion engine would still be used with this auxilliary equipment such as illustrated by patent office symbols of blower 26*a* and jet heater 57, without changing the spirit of the improvement.

In the two systems described products of combustion are aqueously combined under compression condensation and led to a pond for the production of plant food.

DETAILED DESCRIPTION OF THE INVENTION

The invention comprises a retort 1 including a lower section 2 forming a sump for containing raw fluid 34 for distillation and a a heat exchanger 10. A removable upper section 1 forming a sealable union 22 with the lower section 2 providing an enclosure forming a spray zone 37 under an included splash shield 32 spaced away in a secure maner 24 from the retort shell 1 providing a vapor zone 24*a* splash shield 32 protected from the spray zone 37. A submergible engine exhaust nozzle and venturi 9 has a passage 8 communicating with the exhaust manifold 30 of the cooperating combustion engine 13 providing admittance for products of combustion 39 to energize the exhaust nozzle 9 for impelling raw fluid 34 upwardly against the spray shield 32 greatly atomizing and by mingling association heating the spray, providing a jostling prolonged evaporation exposure by up and down movement, of spray particles. Cooling passages formed around the engine combustion chambers permits generated steam to jet 21 down stream into the engine passage 8 and capable of drawing and recycling expanded dehydrated combustion gas 38 from the turbo blower turbine 28 further energizing the exhaust nozzle 9. Communication passages 18 and 18a draw fresh water from sump 14 and mixing at valve 41 with just enough raw fluid from sump 2 to prevent scale formation, serve as an engine coolant urged by an engine driven pump 19. A passage 4 is provided from the retort vapor zone 24*a* communicating with the engine driven compressor 11 for compressing mingling products of combustion 39 and entrained vapor 37 for leading to the heat exchanger 10 for compression heating the raw fluid in the sump 2. The heat exchanger communicates 5 with a seperator 14 where the condensate is drained through a control valve 16 and carried to its intended use providing plant food and water for biological production such as chlorella or other vegetation 42. Such vegetation will utilize the combustion compounds and replacing them with further purifying oxygen, leaving a pure effluent; incidently chlorella can be increased in protein value with ammonia ($N_3$) or fat with carbon dioxide ($CO_2$), both these chemical substances are exhaust products of a combustion engine.

What I claim:

1. A distillation apparatus as characterized for distilling raw fluid of salt water or the like comprising an upper and lower shell seperably and sealably aligned; a sump in the lower said shell for containing a controllable level of said raw fluid; at least one barely submerged exhaust nozzle and venturi cooperating with a communicating combustion engine providing hot products of combustion blasting energy for spraying said raw fluid upwardly against a splash shield, causing a great particulation of said raw fluid, said splash shield is securely spaced away from the upper part of said shell providing a communicating vapor zone into which said hot products of combustion and commingling vapor from said raw fluid are drawn by a communicating combined vacuum pump and compressor, driven by the said combustion engine, for incorporating said commingling hot products of combustion and raw fluid vapor into a liquid condensate in a communicating condenser secured in the said raw fluid sump, providing compression elevated heat to surrounding said raw fluid; a seperator having communication with said condenser that is capable of seperating some of the pressurized dehydrated gaseous products of combustion from said liquid condensate means for leading said gaseous products of combustion to and powering a turbo blower for charging said combustion engine with fuel and air; means for leading condensate from said seperator to a mixing valve having communication with said sump where a tolerable amount of raw fluid is mixed with said fluid and led to a pump for injecting into cooling passages formed around said combustion engines hot spots; means for leading hot fluid from said cooling passages flashed as steam jetting downstream through a mixing ejector capable of drawing exhaust gas from said turbo blower for recycling into said hot products of combustion for supplementing said blasting energy; means for regulating pressure in the seperator and means for leading said condensate from said seperator to a pond for biological production; pressure regulating means for reducing pressure of excess dehydrated gas from said seperator for leading to and bubbling into said pond condensate.

2. A distillation apparatus according to claim 1 provides means for leading a fluid incorporation of combustion compounds and raw fluid condensate into a pond where assisting light energy means cause biological production.

3. A distillation apparatus according to claim 2 provides means for incorporating products of combustion and raw fluid vapor into a solution, means for leading said solution into, means for biological production.

4. A distillation apparatus according to claim 1 provides a lifting tackled upper shell, having sufficient weight to hold it in a doweled, sealable and seperable alignment with its lower shell providing a retort having easy interior access.

* * * * *